United States Patent [19]

Furukawa et al.

[11] 4,075,381
[45] Feb. 21, 1978

[54] LAMINATED GLASS WINDSHIELD AND METHOD OF MAKING SAME

[75] Inventors: Yasuhiko Furukawa; Tsuyoshi Igarashi, both of Tokyo, Japan

[73] Assignee: Asahi Glass Company Ltd., Tokyo, Japan

[21] Appl. No.: 717,687

[22] Filed: Aug. 25, 1976

[30] Foreign Application Priority Data

Sept. 9, 1975 Japan .............................. 50-108529
Dec. 25, 1975 Japan .............................. 50-153961

[51] Int. Cl.$^2$ ..................... B32B 3/02; B32B 27/42; C03B 27/00
[52] U.S. Cl. .................................. 428/192; 428/437; 428/218; 428/410; 156/102; 156/106; 65/104; 65/115
[58] Field of Search ............... 428/410, 437, 192, 218; 65/115, 104; 156/102, 106

[56] References Cited

U.S. PATENT DOCUMENTS

| 2,897,632 | 8/1959 | Fowler | 65/115 |
| 2,943,963 | 7/1960 | Marini | 428/437 |
| 3,081,209 | 3/1963 | Chan | 65/115 |
| 3,107,196 | 10/1963 | Acloque | 428/410 |
| 3,169,900 | 2/1965 | Ermlich | 428/410 |
| 3,278,287 | 10/1966 | Leflet | 65/115 |
| 3,363,936 | 1/1968 | Baker | 65/115 |
| 3,427,770 | 2/1969 | Kunert | 65/115 |
| 3,453,161 | 7/1969 | Golightly | 428/437 |
| 3,793,127 | 2/1974 | Wartenberg | 428/410 |
| 3,904,460 | 9/1975 | Comperatore | 428/437 |

FOREIGN PATENT DOCUMENTS 984,881  3/1965  United Kingdom .................. 65/115

Primary Examiner—Ellis Robinson
Attorney, Agent, or Firm—Oblon, Fisher, Spivak, McClelland & Maier

[57] ABSTRACT

A laminated glass windshield is manufactured by bonding glass plates having a thickness of 1.5 to 2.5 mm together wherein the peripheral portions of the outer surfaces of the glass plates are subjected to a plane compressive stress of 200 to 500 Kg/cm$^2$.

3 Claims, 4 Drawing Figures

LAMINATED GLASS WINDSHIELD AND METHOD OF MAKING SAME

BACKGROUND OF THE INVENTION

1. Field of the Invention

The present invention relates to a laminated glass assembly prepared by bonding glass plates having a thickness of 1.5 to 2.5 mm together.

2. Description of the Prior Art

Laminated glass assemblies have been prepared by bonding two sheets of glass plates together with an intermediate plastic layer such as polyvinyl butyral layer. These laminates have been widely used as front windshields for automobiles. The two glass plates used in the standard laminated glass assemblies for use as windshields in automobiles have a thickness of about 2.5 to 5 mm. The development of thinner laminated glass assemblies in wich thinne glass plates are used, is required from the standpoint of decreasing the weight of the automobile and from the standpoint of safety for occupants in an automobile collision. However, laminated glass assemblies prepared from bonded glass plates having a thickness of less than 2.5 mm have often been broken from shock delivered to the edges of the laminated glass assemblies, in the transportation of laminated glass assemblies and when the assembly is embedded in the frame of an automobile. Accordingly, the handling of such thin laminated glass assemblies has been difficult and cumbersome for practical uses. In order to overcome these difficulties, laminated glass assemblies prepared by bonding thin tempered glass plates have been proposed. However, glass plates having a thickness of less than 2.5 mm could not be satisfactorily tempered by the conventional air quenchtempering method because the plates possess unsatisfactory quenching coefficient. Accordingly, when a glass plate having a thickness of less than 2.5 mm is tempered, it has been necessary to use special tempering methods such as chemically tempering by ion-exchange, or thermally tempering by liquid quenching. In these techniques, a large apparatus and long operating periods have been required and the handling of the plates during the tempering operations is inconvenient. Moreover, the yield is not high enough and it is very difficult to quickly prepare laminated glass assemblies at low cost in mass production.

SUMMARY OF THE INVENTION

Accordingly, one object of the present invention is to provide a laminated glass windshield which has none of the above-mentioned disadvantages, can be mass produced and has the desired characteristics for a front windshield for use in the automobile.

Another object of the invention is to provide a method of mass producing laminated glass windshields having the desired characteristics of front windshields for automobiles.

It has now been found that the stress imparted to the edges of the glass plates upon shock during handling such as when the laminated glass plates are embedded in a car frame is usually less than 200 Kg/cm$^2$. Accordingly, when the plane compressive stress on the peripheral portions of the plates is greater than 200 Kg/cm$^2$, no trouble is encountered during practical handling of the plates and damage of the plates substantially decreases.

DETAILED DESCRIPTION OF THE PREFERRED EMBODIMENTS

Figure 1:
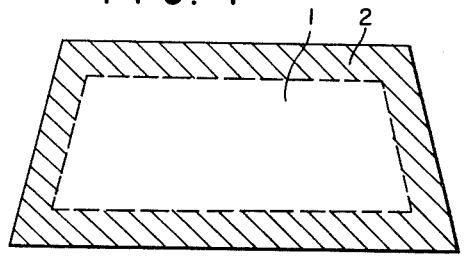
FIG. 1 is a schematic view of a glass plate which has had a plane compressive stress imparted to only the peripheral portions thereof which is to be used for the preparation of the laminated glass assembly of the invention.
Figure 2:
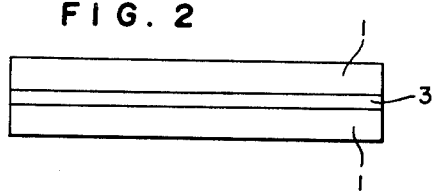
FIG. 2 is a sectional view of the laminated glass assembly.

The results of the present invention have been found as a result of statistical analysis of various repeating tests. The present invention has resulted from these findings in which is provided a laminated glass assembly prepared by bonding two sheets of glass plates having a thickness of 1.5 to 2.5 mm together between which is interposed a plastic layer wherein the peripheral portions of at least the outer surfaces of the glass plates are subjected to a plane compressive stress of 200 to 500 Kg/cm$^2$. The laminated glass assembly can be prepared by:

1. simultaneously shaping by heating two sheets of superposed glass plates on a bending mold at 550° to 650° C;
2. quenching the superposed glass plates at a quenching rate of 85° to 150° C/minute at least in an annealing zone from 450° to 550° C in order to subject a plane compressive stress on the peripheral portions of the glass plates;
3. arranging the glass plate between which is sandwiched a plastic layer by superposing the glass plates so that the glass plates having the plane compressive stress are faced to the outside; and
4. bonding the arranged glass plates in a heat-press to form a one piece laminate.

In the method of the invention, the peripheral portions of the outer surface of the glass plate are subjected to a plane compressive stress of higher than 200 Kg/cm$^2$ to improve the edge strength. As a result, the damage of the laminate when the laminate is embedded in the frame of an automobile during transportation of the laminate can be prevented. The tensile stress generated within the core section of glass plates, and the compressive stress generated into the surfaces of the glass plates are not substantially retained in the central portion of the laminated glass assembly of the invention. Consequently, cracks do not form in all portions of the glass plates unlike the conventional tempered glass plate windshields even though the plates are damaged upon impact or collision when the laminated glass assembly is used as the front windshield for automobiles. Thus, the forward vision of the driver remains unimpaired.

With the conventional apparatus it is difficult to impart the tensile stress which is generated within the core section of the glass plate having a thickness of 1.5 to 2.5 mm to all portions of the plate by air quench tempering. However, plane compressive stress can only be imparted to the peripheral portions of the plate by modifying the bending section of the conventional apparatus or the quenching and tempering apparatus. Accordingly, by use of the modified conventional apparatus, glass plates can be tempered such that the plane compressive stress can be imparted to only the peripheral portions of the plates at low cost thus making mass production of the plates easy.

In the method of the invention, two plate glass sheets are simultaneously shaped and worked such that a plane compressive strength is imparted to the glass plates. The operation is advantageous and thin glass plates having a thickness of 1.5 to 2.5 mm can be shaped without difficulty to any desired shape by bending under dead weight. Such an operation is relatively easy for two sheets of superposed glass plates although it is difficult to shape one sheet of thin glass plate by the conventional apparatus. Moreover, the stress in the sectional direction of the glass plate is low and the desired plane compressive can be imparted on the peripheral portions of the outer surface of the glass plates for which high strength is required. The shape can be formed with high accuracy thus satisfying demand for the plates.

In the present invention, the two plate glass sheets used in the laminated glass assembly have a thickness of 1.5 to 2.5 mm and have the desired rigidity, planness, secondary strain and strength for the laminated glass assembly and are easily shaped into various shapes. If the thickness of the glass plate is more than 2.5 mm, the rigidity and strength of the laminated glass assembly are too high and the plates break upon collision. From a safety point of view the plates are dangerous because of the possibility of brain damage when a person's head strikes the windshield in a collision. When the stress is imparted on the peripheral portions of the glass plate having the indicated thickness, by the following method, the stress may be imparted to the sectional direction of glass plate, which results in high strength of the laminated glass assembly which thereby decreases the safety factor upon collision. Moreover, a crack free zone cannot be maintained in the forward view of the driver through the windshield upon collision. On the other hand, if the thickness of the glass plate is less than 1.5 mm, the rigidity, planness, secondary strain and strength characteristics are not satisfactory and it is difficult to use the glass plates for the laminated glass assembly.

A plane compressive stress of 200 to 500 $Kg/cm^2$, preferably 200 to 350 $Kg/cm^2$ is imparted on the peripheral portions of at least the outer surfaces of the glass plates when the laminated glass assembly is formed. It is necessary that a plane compressive stress greater than 200 $Kg/cm^2$ be imparted to the peripheral portions about 1.5 cm from the edge of the glass plate in order to protect the edge of the plate from shock during transportation or during the embedding operation and to maintain enough strength in the windshield after embedding it in the frame of the window. The plane tensile stress which is imparted to the inside of the plate adjacent the peripheral portion of the plate which has the plane compressive stress on its outer surface, is preferably less than 80 $Kg/cm^2$ when the laminated glass assembly is formed from two sheets of the glass plates. If the stress is higher than 80 $Kg/cm^2$, the laminated glass assembly is easily broken by shock on the outer surface which decreases the safety of the glass, and the laminated glass assembly is not satisfactory for practical purposes. In the curved laminated glass assembly, if a plane tensile stress greater than 80 $Kg/cm^2$ is placed on the outer surface of the convex glass plate, the laminated glass assembly is very easily broken. If the plane compressive stress on the peripheral portions is less than 500 $Kg/cm^2$, especially 350 $Kg/cm^2$, it is easy to decrease the plane tensile stress on the inside adjacent the peripheral portions of the plate to less than 80 $Kg/cm^2$. The plane compressive stress is imparted on the peripheral portions of the plate to less than 15 mm, especially less than 10 mm from the edge. The plane tensile stress in a large laminated glass assembly having an area more than 0.7 $m^2$ which is used in automobiles can be easily decreased to less than 80 $Kg/cm^2$. Although, the present invention has been described in terms of imparting a plane compressive stress of 200 to 500 $Kg/cm^2$ to the peripheral portions of the outer surface of the glass plate, a plane compressive stress of 200 to 500 $Kg/cm^2$ can also be imparted to the peripheral portions of the inner surface of the glass plate which contacts the interposed plastic layer in the laminated glass assembly.

Glass assembly having a plane compressive stress on the peripheral portions thereof can be prepared by the following method. For example, two plate glass sheets are superposed upon each other with an inhibitor for melt-adhesion and are placed on a predetermined bending mold which bends them into a desired shape, and then the mold is inserted into a furnace to heat the glass plates to a temperature of 550° to 650° C to shape them in the desired shape under dead weight corresponding to the bending mold. Then, the glass plates are quenched at a quenching rate of 85° C/min. to 150° C/min. preferably 100° C/min. to 120° C/min. in the annealing zone at 450° to 550° C by injecting air into the quenching device from the vertical direction or the transverse direction to the peripheral portions of the superposed glass plates or by moving the glass plates to a quenching chamber or by naturally quenching the glass plates by removing the plates from the oven, whereby a plane compressive stress of 200 to 500 $Kg/cm^2$ can be imparted only to the peripheral portions of the outer surfaces of the glass plates. If the glass plates are quenched at a quenching rate of 100° C/min to 120° C/min in the annealing zone from 450° to 550° C, a plane compressive stress of 200 to 350 $Kg/cm^3$ can be imparted to the peripheral portions less than 15 mm from the edge of the glass plates and the plane tensile stress on the inside portions can be kept less than 80 $Kg/cm^2$. If the glass plates are quenched at a quenching rate of less than 85° C/min. in the annealing zone at a temperature from 550° to 450° C, a plane compressive stress greater than 200 $Kg/cm^2$ is not imparted on the peripheral portions. If the glass plates are quenched at a quenching rate greater than 150° C/min., the plane tensile stress on the inner portions of the glass plates cannot be kept less than 80 $Kg/cm^2$.

Sometimes, the deformation or the curve of the glass plates is undesirable as glass plates for a laminated glass assembly. In accordance with the present method, a plane compressive stress of 200 to 500 $Kg/cm^2$ can be advantageously imparted to the peripheral portions of the glass plate at the same time in high productivity. Thus, it is possible to impart a plane compressive stress of 200 to 500 $Kg/cm^2$ on the peripheral portions of the plate by the following method. The glass plate is placed on the gas bed of a gas furnace and is heated at 550° to 650° C. It is then moved to a bending mold and is shaped to a desired shape by suction on the surface of the mold having the desired shape. This is known as an air-form method. The shaped glass plate is naturally quenched or is quenched with air. In this case, the glass plate is separately shaped and is quenched so as to impart a plane compressive stress on the peripheral portions of the outer surface of glass plate. A plane compressive stress of 200 to 500 Kg/cm² can also be imparted on the peripheral portions by the glass plate by this method.

A sectional stress in the sectional direction of the glass plate is not achieved by this method, but a plane compressive stress is imparted on the peripheral portions by the above mentioned method of quenching the glass plates whereby an optimum front laminated glass windshield is obtained for automobiles. Two plate glass sheets having tempered peripheral portions are arranged with an interposed layer of a plastic such as polyvinyl butyral, or polyurethane layer under the face of the surfaces which have the plane compressive stress on the outer sides. The arranged glass plates are bonded by the conventional method to form the laminated glass assembly. For example, the arranged glass plates are placed into a preliminary press bag, and are heated to a temperature of 80° to 90° C under a reduced pressure of 500 to 650 mmHg. The preliminary pressed glass plates are then heated in an autoclave at 120° to 145° C under a pressure of 12 to 14 Kg/cm² for about 15 to 30 minutes to bond the glass plates between which is interposed a plastic layer whereby the laminated glass assembly of the invention is obtained.

Having generally described the invention, a more complete understanding can be obtained by reference to certain specific examples, which are provided herein for purposes of illustration only and are not intended to be limiting unless otherwise specified.

EXAMPLE

11 Pairs of two glass plates having a size of 663 mm and 1342 mm and a thickness of 2.0 mm were prepared. Each pair of glass plates were placed on a bending mold for dead weight bending and were inserted into a furnace whose outlet temperature was set as shown in Table 1, column A. The plates were heated at 590° to 605° C and bent under the dead weight to the desired shape. The heated glass plates were moved to a quenching chamber, wherein the temperature at the inlet was set as shown in Table 1, column B. The plates were quenched at the quenching rate shown in Table 1, column C over an annealing temperature of 450° to 550° C whereby a plane compressive stress was imparted to the peripheral portions of the glass plates. The plane compressive stress (average value) on the peripheral portions of each glass plate were measured and the results are shown in Table 1, column D. The area of plane compressive stress of all samples was retained only in the zone less than 10 mm from the edge. The plane tensile stress in the central part of each sample was also measured and the results are shown in Table 1 right column. A pair of glass plates having a plane compressive stress on the peripheral portions of the outer surfaces were superposed on one another between which were sandwiched a layer of polyvinyl butyral having a thickness of 0.76 mm to prepare the arranged glass plates. The arranged glass plates were put in a preliminary press bag and were heated at 85° C under a reduced pressure of 600 mmHg to preliminary press the arranged glass plates. The pressed glass plates were heated in an autoclave at a temperature of 130° C under a pressure of 13 Kg/cm² for 20 minutes to bond the glass plates and the interposed polyvinyl butyral layer together whereby the laminated glass assembly was obtained. The static pressure resistant tests for 11 laminated glass assemblies were conducted. The results are shown in Table 1, right column. In reference 1, two plate glass sheets having a thickness of 2.5 mm and having no plane compressive stress on the peripheral portions were bonded with an interposed polyvinyl butyral layer having a thickness of 0.76 mm. The laminated glass assembly of 2.5 mm glass plate-0.76 mm polyvinyl butyral-2.5 mm glass plate is a practically useful laminate. The laminated glass assemblies of the invention had static pressure resistances which were the same or higher than that of a satisfactory product. In Reference 2, two plate glass sheets having a thickness of 2.0 mm and no plane compressive stress on the peripheral portions were bonded together with an interposed polyvinyl butyral layer having a thickness of 0.76 mm.

TABLE 1

| Sample No. | A Temperature At Outlet Of Furnace | B Temperature At Inlet Of Quenching Chamber | C Quenching Rate From 550–450° C | D Plane Compressive Stress On Peripheral portions of Glass Plate | E Plane Tensile Stress In Central Part Of Glass Plate | F Static Pressure Resistant Test |
|---|---|---|---|---|---|---|
| 1 | 690 | 250 | 110 | 250 | 40–50 | 45 |
| 2 | 680 | 250 | 100 | 230 | 30–40 | 43 |
| 3 | 670 | 250 | 95 | 215 | 23–35 | 42 |
| 4 | 660 | 250 | 90 | 200 | 20–30 | 40 |
| 5 | 650 | 250 | 85 | 190 | 20–30 | 35 |
| 6 | 690 | 200 | 130 | 300 | 60 | 55 |
| 7 | 680 | 200 | 120 | 270 | 50 | 50 |
| 8 | 670 | 200 | 110 | 250 | 40–50 | 45 |
| 9 | 660 | 200 | 100 | 230 | 30–40 | 43 |
| 10 | 650 | 200 | 90 | 200 | 20–30 | 40 |
| 11 | 720 | 180 | 150 | 350 | 80 | 63 |
| Reference 1 | — | — | — | 40–100 | 0 | 35–45 |
| 2 | — | — | — | 40–100 | 0 | 15–20 |

Figure 3:
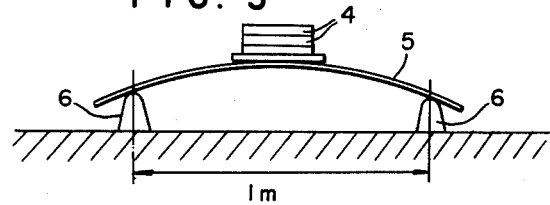
FIG. 3 shows a stational pressure resistant test method.
Figure 4:
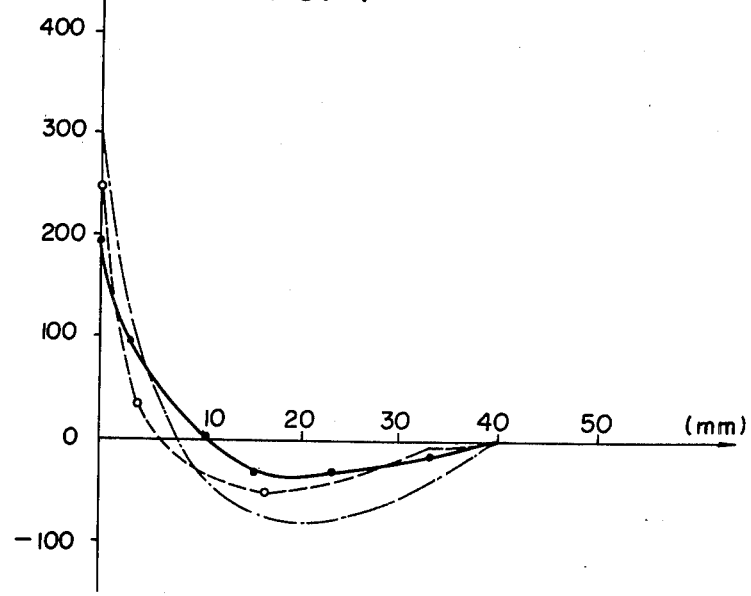
FIG. 4 is a graph showing the distribution of plane stresses along the peripheral portions of laminated glass assemblies.

11 Laminated glass windshields were prepared by the present method and were not broken during transport or when embedded in the window frame of an automobile. In the static pressure resistant test, as shown in FIG. 3, a sample of a laminated glass assembly was placed on two supports which held the side portions of the assembly by the projecting supports and many 1 Kg weights were sequentially placed on the laminated glass assembly. The total accumulated weight placed on the laminated glass assembly was noted when the assembly broke. Among the samples shown in Table 1, the stress distributions of sample Nos. 1, 4 and 10 on the peripheral portions were measured. The results are shown in FIG. 4, wherein the full line A designates samples No.

4, the dotted line B designates sample No. 1 and chain line C designates sample No. 10. The ordinate is the stress and the abscissa represents the distance from the edge of the glass plate. As is clear from FIG. 4, the plane compressive stress on the peripheral portions of the glass plates was distributed within 10 mm from the edge of the glass plates. The plane tensile stress which generated on the inner portion of the zones formed by the plane compressive stress in the glass plates was less than 80 Kg/cm². The stress was zero in the zone inside the zone possessing the plane compressive stress.

Having now fully described the invention, it will be apparent to one of ordinary skill in the art that many changes and modifications can be made thereto without departing from the spirit or scope of the invention as set forth herein.

We claim:

1. A laminated glass windshield, which comprises: two sheets of shaped plate glass bonded together by an interposed plastic layer wherein each of said glass plates has a thickness of 1.5 to 2.5 mm and has a plane compressive stress of 200 to 500 Kg/cm² on the peripheral portions of the outer surface within 15 mm of the outer edge of said plates and a tensile strength inside and adjacent said peripheral portions of less than 80 Kg/cm².

2. A laminated glass windshield, which comprises: two sheets of shaped plate glass bonded together by an interposed plastic layer wherein each of said glass plates has a thickness of 1.5 to 2.5 mm, a plane compressive stress of 200 to 350 Kg/cm² on the peripheral portions of the outer surface within 15 mm of the outer edge of said plates and a plane tensile stress less than 80 Kg/cm² on the inside zone adjacent to the peripheral portion having said plane compressive stress.

3. A method of making a laminated glass windshield, which comprises the steps of:
   simultaneously shaping by heating two superimposed sheets of glass plates having a thickness of 1.5 to 2.5 mm on a bending mold at 550° to 650° C;
   quenching the glass plates at a quenching rate of 85° to 150° C/minute at least in an annealing zone from 450° to 550° C such that a plane compressive stress of 200 to 500 Kg/cm² is imparted to the peripheral portions of the outer surface of the glass plates within 15 mm of the outer edge of said plates;
   arranging the glass plates such that between said plates is sandwiched a plastic layer and such that the face of each plate which has the plane compressive stress is faced outward; and
   bonding the arranged glass plates by heat-pressing to form said laminate.

* * * * *